United States Patent [19]

Nitschke et al.

[11] Patent Number: 5,586,486

[45] Date of Patent: Dec. 24, 1996

[54] AUTOMATED DEEP FRYER

[75] Inventors: John S. Nitschke, Perrysburg; Daniel B. Kuhary, Whitehouse, both of Ohio

[73] Assignee: Vend-It Corporation, Perrysburg, Ohio

[21] Appl. No.: 344,151

[22] Filed: Nov. 23, 1994

Related U.S. Application Data

[63] Continuation-in-part of Ser. No. 190,866, Feb. 1, 1994, Pat. No. 5,367,949.

[51] Int. Cl.$^6$ .............................. A47J 37/00; A47J 37/12
[52] U.S. Cl. ................... 99/330; 99/334; 99/336; 99/357; 99/407
[58] Field of Search ...................... 99/330, 331, 357, 99/334–336, 403–410, 411, 412, 427, 450; 221/150 R, 150 HC, 150 A; 426/438–441, 231, 523; 210/DIG. 8, 167; 55/DIG. 36, DIG. 30; 126/374, 384; 219/486, 492, 494; 364/400, 557

[56] References Cited

U.S. PATENT DOCUMENTS

| | | |
|---|---|---|
| 3,667,373 | 6/1972 | Sicher et al. . |
| 3,701,313 | 10/1972 | Boggs . |
| 4,228,730 | 10/1980 | Schindler et al. . |
| 4,502,372 | 3/1985 | Mariotti . |
| 4,540,588 | 9/1985 | Bartfield . |
| 4,636,949 | 1/1987 | Longabaugh ..................... 99/327 X |
| 4,722,267 | 2/1988 | Galockin et al. . |
| 4,748,902 | 6/1988 | Maurantonio . |
| 4,785,725 | 11/1988 | Tate et al. . |
| 4,838,455 | 6/1989 | Hoeberigs . |
| 4,949,879 | 8/1990 | Mariotti . |
| 5,003,868 | 4/1991 | Higgins et al. . |
| 5,052,288 | 10/1991 | Marquez et al. . |
| 5,069,116 | 12/1991 | Marquez et al. . |
| 5,097,754 | 3/1992 | Covington et al. . |
| 5,104,002 | 4/1992 | Cahlander et al. . |
| 5,105,979 | 4/1992 | Bakx et al. . |
| 5,115,731 | 5/1992 | Maitland . |
| 5,142,968 | 9/1992 | Caron et al. . |
| 5,174,470 | 12/1992 | North et al. ..................... 221/150 HC |
| 5,189,944 | 3/1993 | Rasmussen et al. ..................... 99/334 |
| 5,224,415 | 7/1993 | McFadden et al. . |

Primary Examiner—Timothy F. Simone
Attorney, Agent, or Firm—Brooks & Kushman P.C.

[57] ABSTRACT

An automated deep frying system includes a refrigerated food storage compartment having a portion controller and dispenser, an isolated cooking chamber having a frying vessel and a food basket which is movable to a variety of preselected positions for loading, cooking and dispensing the food, and an air purifier including a smooth cold surface for isolating the by-products of the frying process. The system also includes a microprocessor controller which is programmed for the system operation, including automatic dispensing, preparation and serving of preselected portions of food in response to an operator's input, as well as energy efficient control of the refrigerated food storage compartment and the air purifier cold plate.

56 Claims, 8 Drawing Sheets

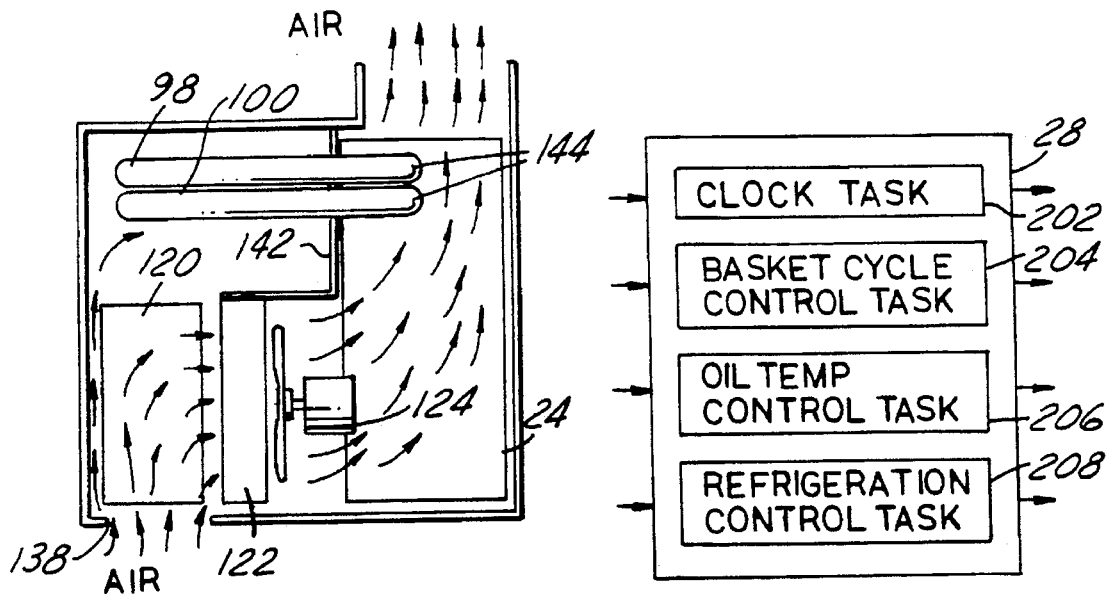
FIG.18
FIG.19
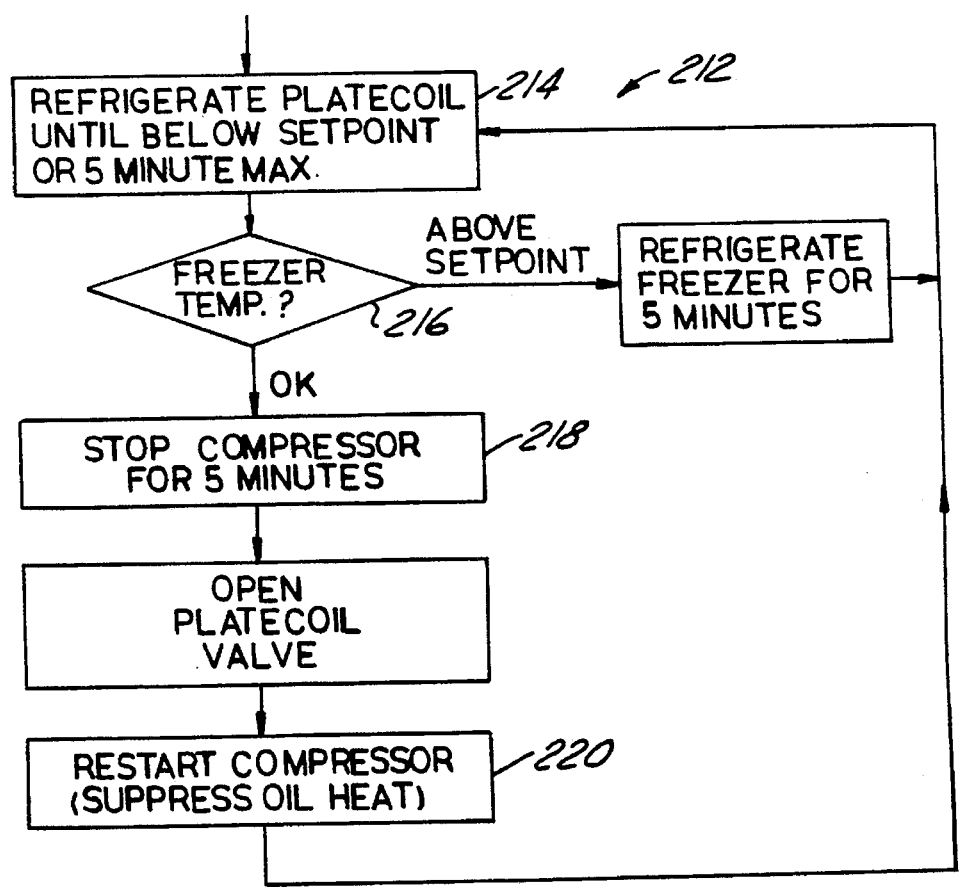
FIG.20

AUTOMATED DEEP FRYER

This application is a continuation-in-part of "An Automated Ventless Deep Fryer," Ser. No. 08/190,866, filed Feb. 1, 1994, now U.S. Pat. No. 5,367,949.

TECHNICAL FIELD

The present invention relates to a system for automated portioning, deep frying, and dispensing of food such as french fries.

BACKGROUND ART

Deep fat frying of various foods, including french fries, chicken, fish, onion rings, and breaded vegetables, is a well known and popular method of cooking. Deep frying equipment utilized by restaurants or other establishments for preparing food for public consumption is typically expensive and complex equipment which includes built-in fans, duct work, and filtering systems for venting the airborne by-products of the deep frying process.

U.S. Pat. No. 5,003,868, issued to Higgins et al., discloses an automated deep fry vending machine for frying a controllable portion of food in a closed (or ventless) environment. This and other prior attempts at ventless cooking have several drawbacks. The vending machines were large and energy inefficient. Also, they were mechanically complex and subject to frequent breakdowns. In addition, existing deep fry machines require frequent service to drain and replace the frying oil.

It is therefore an object of the present invention to provide a more compact, self-contained automated deep fryer.

It is another object of the present invention to provide a deep fryer with improved energy efficiency.

It is another object of the present invention to provide a deep fryer with an improved air purifier which isolates airborne, bitter smelling organic compounds in an area remote from the cooking area and the food storage area and is easily cleaned and maintained.

It is another object of the present invention to provide a deep fryer with a sealed cooking chamber which does not allow the airborne byproducts of the frying process to contaminate the stored food.

DISCLOSURE OF THE INVENTION

In carrying out the above and other objects, the automated deep frying system of the present invention includes a refrigerated food storage compartment having a portion controller and dispenser, an isolated cooking chamber having a frying vessel and a food basket which is movable to a variety of preselected positions for loading, cooking, and dispensing the food, an air purifier including a cold surface for isolating the byproducts of the frying process, and a control for programmed dispensing, preparation, and serving of preselected portions of food in response to an operator's input.

The cooking chamber employs a pivotally mounted access door, upon which the food basket is preferably mounted in an orientation which results in partial immersion of the food basket in the frying vessel when the access door is in its closed position, sealing the cooking chamber during the cooking cycle. The access door is driven by an actuator to one of a plurality of predefined positions, including the aforementioned closed position for cooking, a partially open position for food loading, a post-cooking, oil-draining position, and a food dispensing position.

The atmosphere of the otherwise sealed cooking chamber is vented to the air purifier which employs a cold plate having a cold surface over which the fumes from the cooking compartment travel, and on which water and bitter smelling organic compounds condense. The cold plate is positioned within the air purifier chamber in the path of the fumes between the inlet of the air purifier and a filter, through which the air travels prior to recirculation of the air into the cooking chamber.

The food storage compartment is refrigerated to preserve the food, and includes a dispensing mechanism including a portion controller for dispensing a pre-selected portion of the food from the storage compartment into the food basket for deep frying in the cooking chamber. The compartment is preferably cylindrically shaped. The dispensing mechanism preferably comprises a plurality of arms mounted upon a center post in the storage compartment such that the arms extend radially outward from the center to the walls of the cylindrical compartment. The post is powered for rotation, causing the radial arms to sweep a predetermined arc within the cylinder to collect the food and distribute it efficiently to a portion bin for subsequent release from the food storage compartment into the food basket.

The control preferably employs a microprocessor which is suitably programmed to provide the appropriate signals to control the actuators for automatic dispensing, cooking, and serving of the food, as well as a variety of pre-programmed, periodic system maintenance and operation functions.

The cooking chamber is also provided with an oil overflow run-off, from which oil from the frying vessel is directed into a remote oil trap. The control is preferably programmed to periodically add a preselected amount of oil to the frying vessel to cause the frying vessel to overflow by a planned amount when the basket containing the to-be-prepared food is immersed in the frying vessel, thereby providing an automatic surface skimming and controlled replenishment of the cooking oil, while maintaining an optimal oil level within the frying vessel.

These and other objects, features, and advantages of the present invention are readily apparent from the following detailed description of the best mode for carrying out the invention, taken in connection with the accompanying drawings.

BRIEF DESCRIPTION OF THE DRAWINGS

FIG. 18 is a schematic view of the rear portion of the fryer showing the air flow therethrough;

FIG. 19 is a block diagram of the controller;

FIG. 20 is a flowchart of the run mode sequence of the refrigeration task;

BEST MODE FOR CARRYING OUT THE INVENTION

Figure 1:
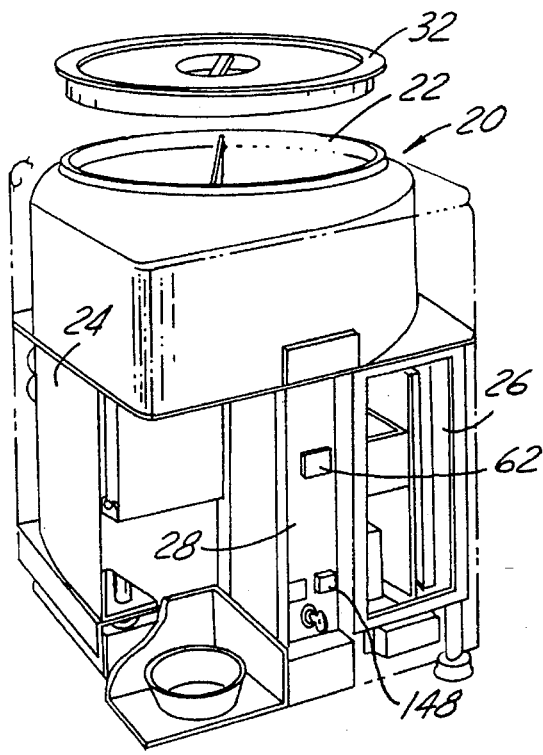
FIG. 1 is a perspective view of the fryer of the present invention with the outer shell shown in phantom.
Figure 2:
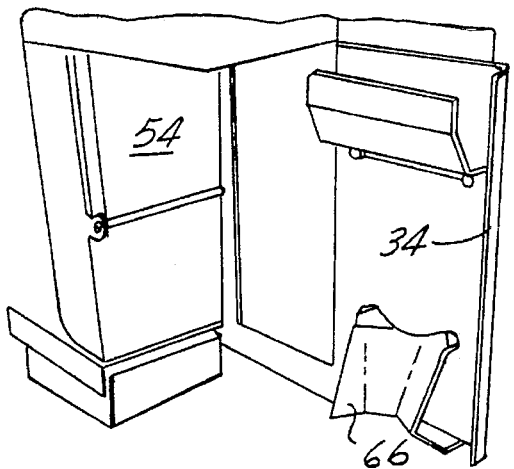
FIG. 2 is a perspective view of the lower left front portion of the fryer with the access door open.
Figure 3:
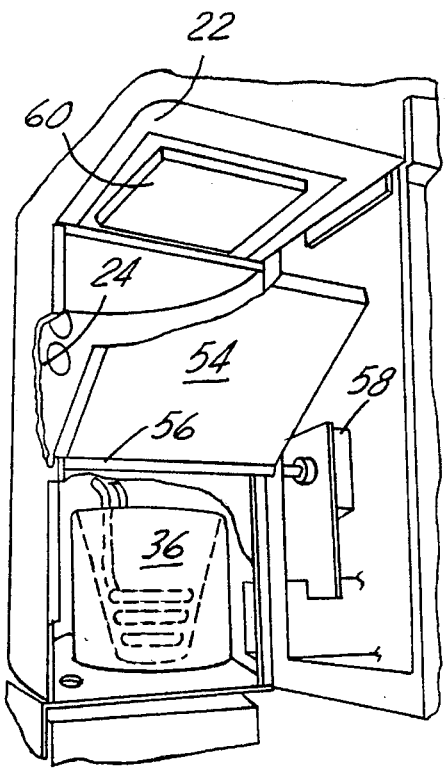
FIG. 3 is another perspective view of the lower front left corner of the fryer showing the access doors to the food storage compartment and cooking chamber, and including cutaway views of the cooking chamber access door drive motor and axle and the frying vessel inside the cooking chamber.
Figure 4:
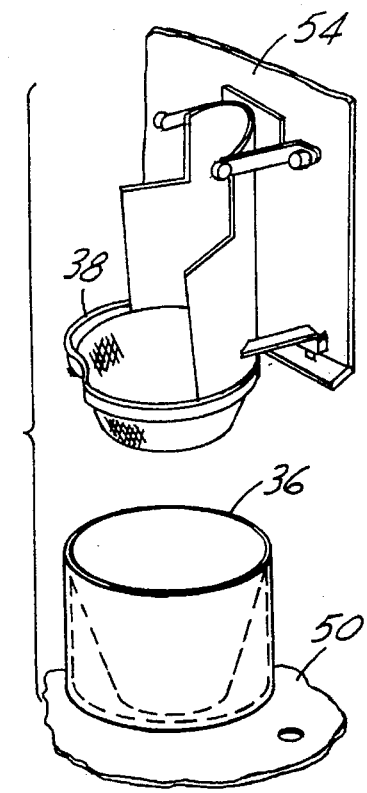
FIG. 4 is a cutaway view of the cooking chamber access door with the food basket mounted thereon, the frying vessel, and a portion of the floor of the cooking chamber.

Referring to FIG. 1, the fryer of the present invention, generally referred to as 20, includes a refrigerated food storage compartment 22, an isolated cooking chamber 24, an air purifier 26, and a control 28 for programmed dispensing, preparation, and serving of a preselected portion of food in response to an operator's input. All of the components of the fryer 20 are preferably mounted for encasement within a shell 30, preferably made of stainless steel. The shell, of course, includes openings for access to the food storage compartment, via lid 32, the food dispensing area via access door 34 (shown in FIG. 2). The shell 30 also preferably includes an access door (not shown) which encloses the air purifier 26. The access door enclosing the purifier 26 is preferably pivotally mounted so that it can be moved from its closed position into an open position to allow access to the purifier 26 for cleaning and/or service.

Referring now to FIGS. 1–4, the food storage compartment 22 is preferably mounted above the cooking chamber 24, so that the food can be gravity-fed from the storage compartment 22 into the cooking chamber 24. The cooking chamber 24 includes a frying vessel 36 which holds heated cooking oil, and is of a size and shape adequate to accept a food basket 38 containing a preselected portion of the food to be cooked. The volume of the frying vessel is minimized in order to minimize the amount of oil which must be used, as well as to minimize the energy required to maintain the oil at the proper cooking temperature. In the preferred embodiment, the oil reservoir 35 of the cooking vessel 36 is of a generally frustoconical shape. The relatively larger volume of oil is thus in the upper portion of the frying vessel 36 which receives the frying basket 38. The area below the frying basket is significantly reduced in volume with this frustoconical design, thereby reducing the volume of oil required and the energy required to heat it, as described above.

The outer sidewalls of the frying vessel 36 are generally cylindrical in shape. Any excess oil and surface contaminant which overflow from the oil reservoir will harmlessly flow down the relatively cooler sidewalls of the cooking vessel to the floor of the fryer. The floor is preferably provided with a drainage hole through which the excess oil can drain into a suitable container (not shown) for disposal.

It will be appreciated that, by supplying an additional predetermined amount of new oil to the frying vessel on a periodic basis via, for example, the injection of the oil from a replenishment reservoir (230, FIG. 22) through suitable conduit (232, FIG. 22), through the wall of the cooking chamber 24 into the frying vessel 36, the repeated immersion of the food basket 38 with food into the frying vessel 36 will cause the oil to overflow causing excess oil, including floating debris on the surface of the oil, to be automatically drained. Thus, by controlled periodic replenishment of the oil to the frying vessel 36, the variation in oil level between basket in-and-out cycle can be maintained at a significant enough level to exceed the volume of the frying vessel, thereby insuring periodic drainage of the surface oil and floating debris from the fry vessel 36. This automatic surface skimmer eliminates the cost and complexity of additional pumps and filters which are often used on high-capacity deep frying equipment.

Figure 22:
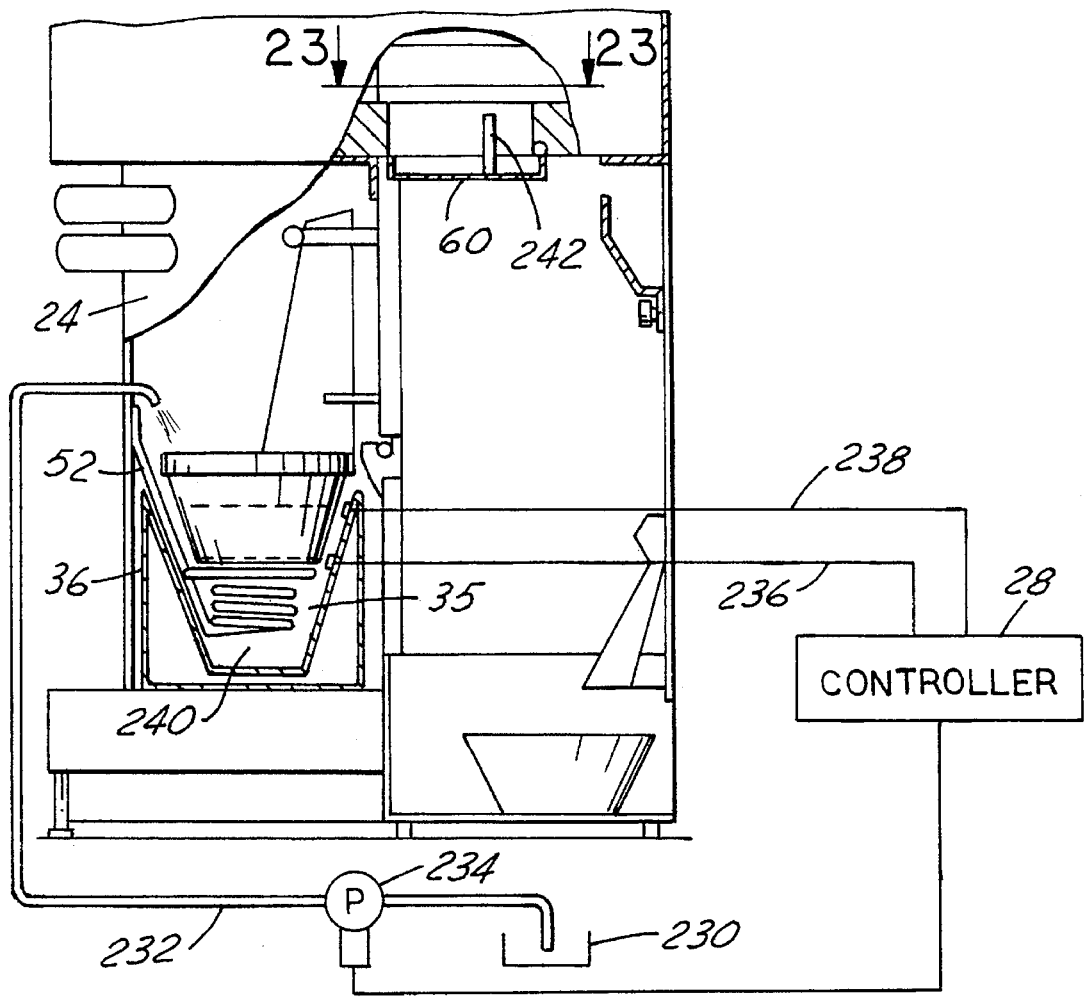
FIG. 22 is a partial cross-sectional side view of the fryer showing an embodiment including the oil replenishment system.

Referring to FIG. 22, in one embodiment of the present invention, an oil replenishment reservoir 230 is connected, via conduit 232, to the inside of the cooking chamber 24 to supply oil to the oil reservoir 35 of the cooking vessel 36. The control 28 is suitably connected to operate a pump 234 based on various preselected criteria to pump a predetermined amount of oil into the frying vessel reservoir 35. In this embodiment, the optimal amount of oil in the frying vessel reservoir 35 has been found to be about 50 ounces. The control increments a cumulative order counter upon the preparation of each order. When the cumulative order count counter reaches a preselected number of orders, (about 4–16, and preferably 8), the control generates a signal to activate the pump 234 to pump a predetermined amount of oil (about 1–4 ounces, and preferably about two ounces) into the reservoir 35 to replenish the oil therein. Upon completion of the replenishment cycle, the control then resets the cumulative order counter to zero to re-start the sequence.

As an alternative to, or supplementing, the automatic oil replenishment based upon the number of orders processed, the system may also include logic for automatic replenishment of oil whenever the oil in the frying vessel reservoir 35 is detected to be below a predetermined level. One embodiment for detecting oil level, shown in FIG. 22, includes a first temperature sensor 236 and a second temperature sensor 238 mounted within the oil reservoir 35 of the frying vessel 36 and connected as inputs to the controller 28. The first temperature sensor 236 and second temperature sensor 238 are commercially available thermistors.

The second temperature sensor 238 is preferably mounted on the inside of the frying vessel 36 at a level that is about equal to, or just below, the desired oil level. The first temperature sensor 236 is also mounted within the cooking vessel 36 at a relatively deeper location within the reservoir. When the cooking oil is at the normal level, each of the temperature sensors will indicate approximately the same temperature, the temperature of the oil. If the oil level falls below the level of the second temperature sensor 238, it will begin to register a significantly lower temperature. Thus, by periodically monitoring each of these temperature sensors, the control can determine when the oil level within the frying vessel 36 has fallen below a predetermined acceptable level. In one embodiment, the control logic uses the first temperature sensor 236 to determine when the oil is within an acceptable operating temperature range. If it is, the control then determines whether the temperature detected by the second temperature sensor 238 is lower than the temperature detected from the first temperature sensor 236 by more than a predetermined amount. If so, the controller initiates an oil replenishment cycle as described above. Thus, by counting food orders processed, or by detecting the level of the oil in the frying vessel 36, or by some combination of these periodic condition sensing activities, the system of the present invention can periodically automatically replenish oil in the frying vessel 36, without interruption of normal operation.

In one contemplated embodiment, the logic periodically detects the level of the oil and, if the level has fallen a predetermined threshold, the control logic generates a signal to the pump to replenish the frying vessel with enough oil to fill, but not overfill, the frying vessel. In addition to this periodic checking and replenishing function, the control logic also activates the pump to pump a selected amount of oil (.preferably about two ounces) when a cumulative order counter reaches a preselected number of orders for the purpose of over-filling the frying vessel reservoir 35 so that some oil and the floating debris on the surface of the oil is drained from the frying vessel 36 as described above.

Figure 5:
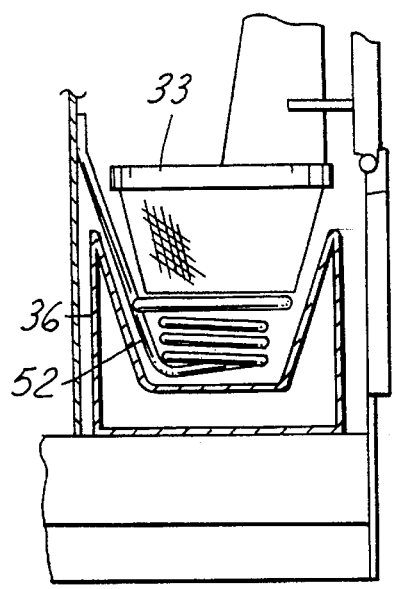
FIG. 5 is a partial cross-sectional side view of the fryer showing the frying vessel and heating element mounted therein.
Figure 10:
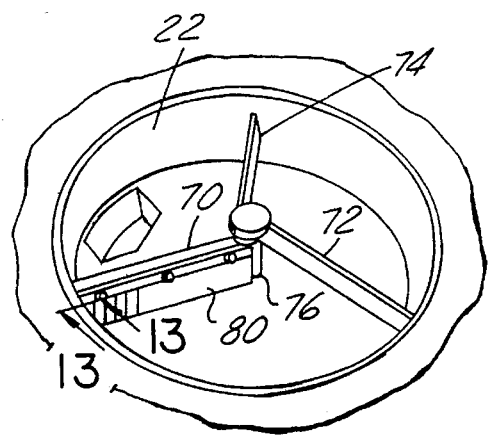
FIG. 10 is a top perspective view of the inside of the food storage compartment.

Referring to FIG. 5, the frying vessel 36 includes a heating coil 52 which is preferably bent into a generally helical configuration, with the coils having a varying diameter to conform generally with the frustoconical shape of the oil reservoir, for placement within the frying vessel immediately below the fully immersed food basket 38. The heating coil may be of the type generally available such as from the Chromalux Company, and includes a conventional plug for removable mounting to an electrical connector on the inside wall of the cooking chamber 24.

It should be noted that, in the embodiment shown in FIG. 22, the oil reservoir 35 in the frying vessel may be configured with a cold space 240 below the heating coil 52, thereby allowing food particles and other by-products to migrate to the bottom of the reservoir 35 where they will be relatively isolated from the food in the food basket 38. And, since the oil in this space will be relatively cooler than the oil in the area of the reservoir 35 occupied by the heating coil 52, the food particles and other by-products will react with the oil at a relatively lower rate than in the hotter oil above the cold spot.

Referring again to FIGS. 3 and 4, the cooking chamber 24 is preferably isolated from the other components of the fryer, as well as from the outside environment. The food enters the chamber through an access door 54 which is swingably mounted for positioning between a closed position (shown in FIG. 2) sealing off the chamber from the other components in the external environment, to a plurality of open positions for receiving food, dispensing food, or maintenance and/or servicing the equipment. The door is preferably mounted on an axle rod 56 which, in turn, is mounted to a drive motor 58 which powers the axle to swing the access door 54 from its closed position to its various preselected open positions. A second access door 60 is swingably mounted on the underside of the food storage compartment 22. This access door 60 is preferably swingable from its closed position to an open position which allows for discharge of the preselected portion of food into the food basket 38.

Figure 6:
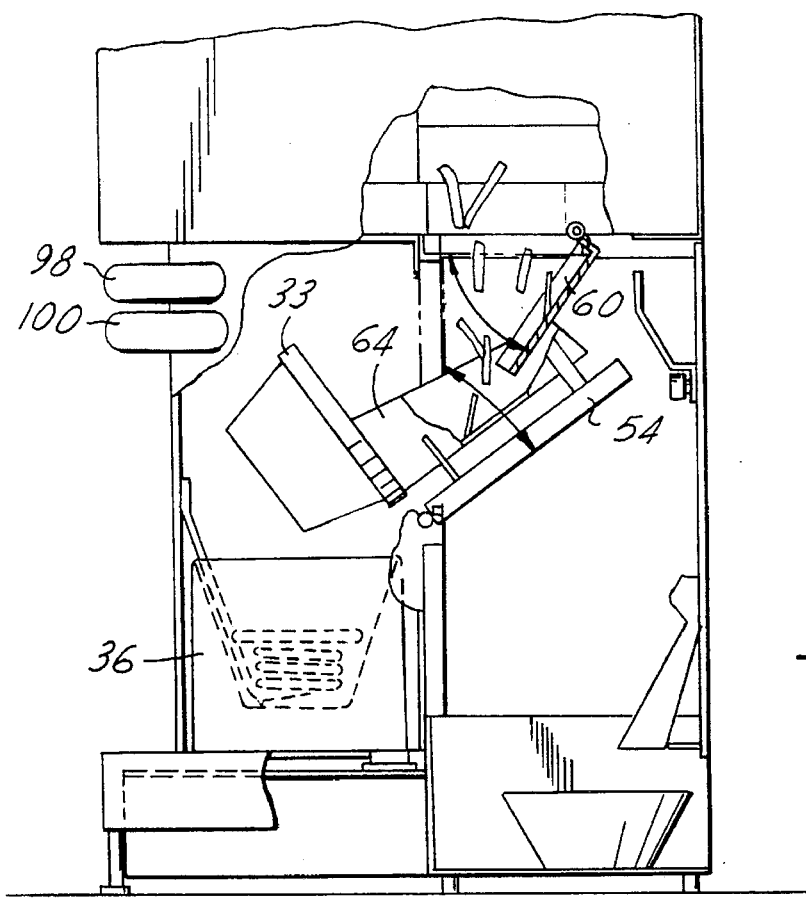
FIG. 6 is a partial cross-sectional side view of the fryer showing the access doors and food basket in the food load position.
Figure 7:
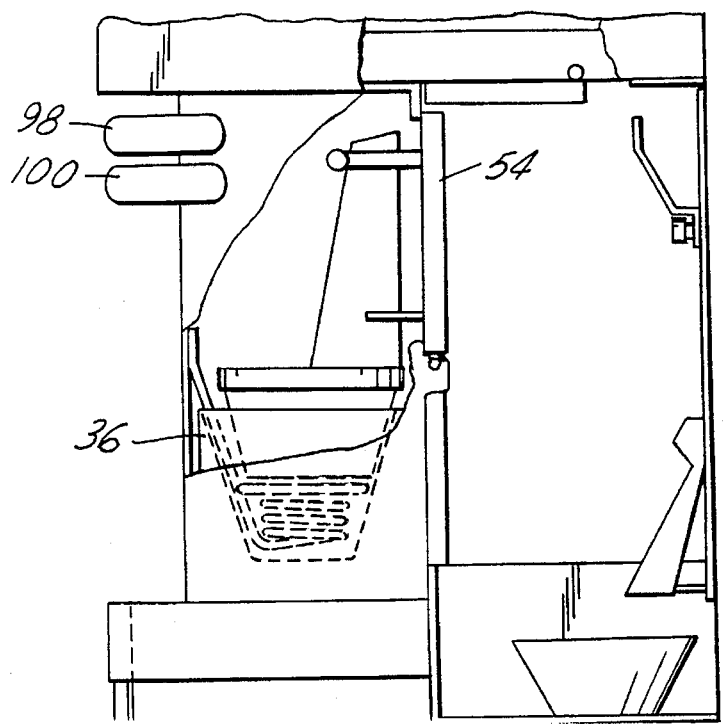
FIG. 7 is a partial cross-sectional side view of the fryer showing the food basket in the cooking position.
Figure 8:
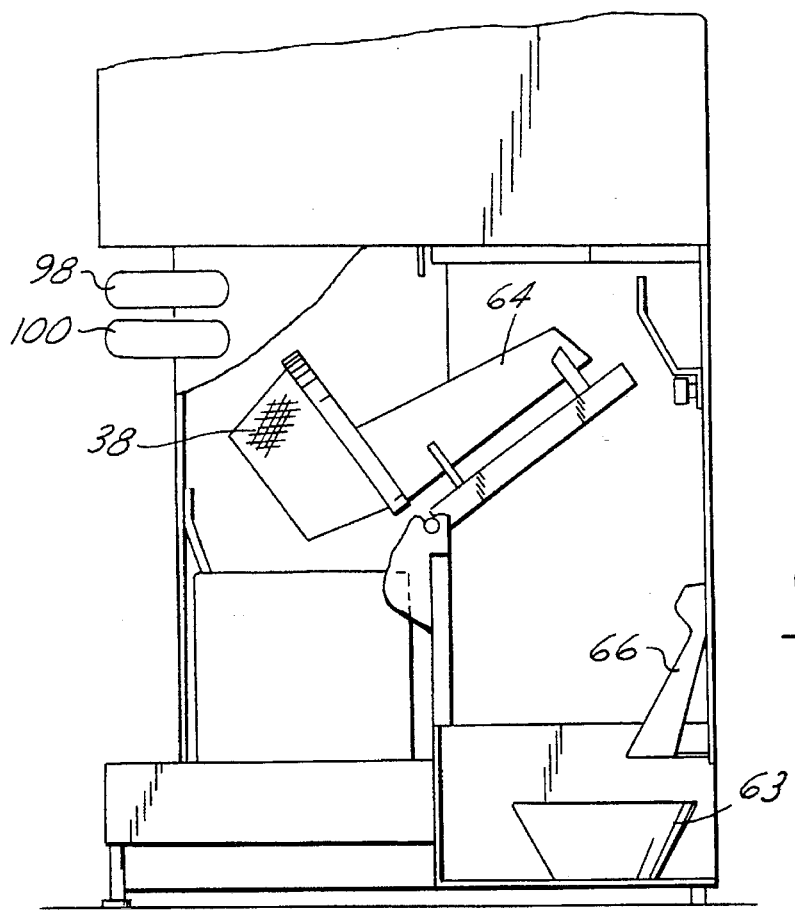
FIG. 8 is a partial cross-sectional side view of the fryer showing the cooking basket in the drain position.

FIGS. 6–8 illustrate the various positions of the access doors 54 and 60 and the frying vessel 36 during a cooking cycle. Upon receiving the appropriate input (typically upon receiving a signal from a push-button 62 (shown in FIG. 1) on the front panel of the fryer 20, the cooking chamber access door 54 is opened to its loading position, and the storage compartment access door 60 is also opened, thereby releasing the preselected portion of the food by gravity-feed into the food basket 38. Access door 54 is then moved to its closed position, thereby positioning the food basket 38 and the food in the frying vessel 36 for cooking for an adjustable, predefined time period. In one embodiment, access door 60 is forced to a closed position by its contact with the cooking chamber access door 54 during movement of the access door 54 from its loading position to its closed position. Once closed, the access door 60 may then be latched, either mechanically or magnetically. However, as will be appreciated by those skilled in the art, the food storage compartment access door 60 could be driven by a drive motor in a manner similar to access door 54.

At some time following release of the food into the food basket and closure of the food storage compartment access door, the control 28 activates the drive motor in the food storage compartment 22 to deliver a predefined portion of the food (as hereinafter more fully described in conjunction with FIGS. 10–13) for discharge from the storage compartment 22 during the next cooking cycle.

After the food is cooked for an adjustable, predefined period of time, cooking chamber access door 54 is then automatically positioned from its closed position (shown in FIG. 7) to an intermediate draining position (shown in FIG. 8) to allow cooking oil to drain from the ready-to-eat food back into frying vessel 36. This draining position may be an angle which is suitable for simultaneously removing the food from the oil and positioning the food basket 38 over the frying vessel 36 for drainage of the cooking oil into the frying vessel. The draining period is typically 4–30 seconds, and preferably about 14 seconds. The draining period is also preferably of sufficient duration to allow the food surface to cool to the desired eating temperature.

Figure 9:
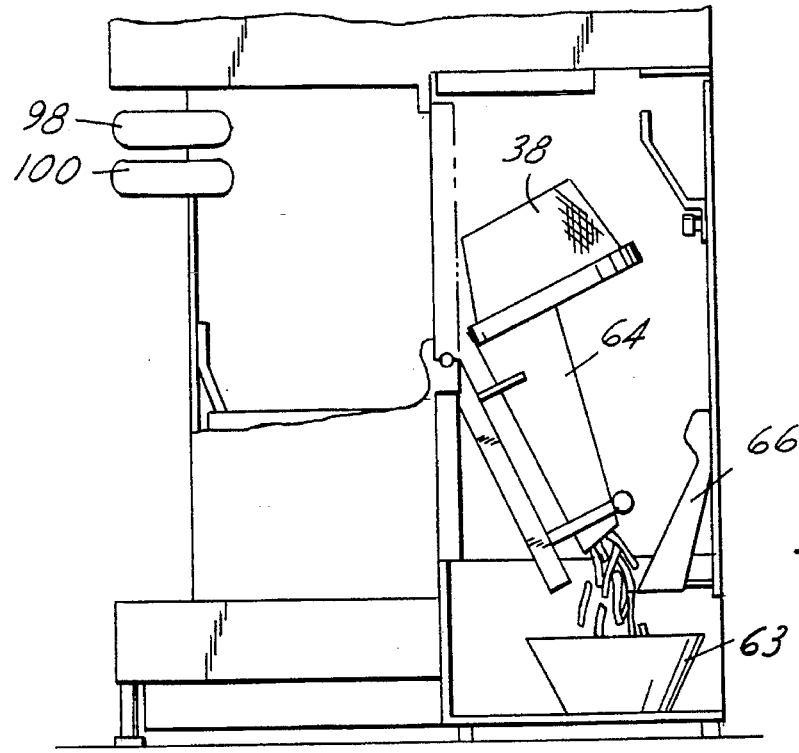
FIG. 9 is a partial cross-sectional side view of the fryer showing the cooking basket in the unload position.

Referring to FIG. 9, the heating chamber access door 54 and the food basket 38 are then moved to the discharge position and the food is emptied by gravity-feed into a serving container 63 of suitable size. It should be noted that first shield 64 and second shield 66 serve to guide the falling food into the dish.

The food basket 38 preferably includes a shield 64 which, along with the inside surface of the access door 60, serves as a guideway for the falling food into the food basket 38.

Referring now to FIGS. 10–13, the food storage compartment 22 includes a portion controller preferably comprising a plurality of radially extending arms 70–74 each of which is mounted on a rotating center post 76 which in turn is powered by a suitable drive motor. By rotating the center post 76, the arms sweep in a circular manner about the entire circular cross-section of the compartment 22. In the preferred embodiment, one or more of the arms 72 and 74 are mounted at a suitable distance above the floor 78 of the storage compartment to help move, without damaging, the food pieces as the center post and arms are rotated within the compartment 22. One arm 70 is provided with a barrier 80 which, upon rotation of the portion control aggregates and sweeps the food ahead of it as the arm is rotating.

A portion bin 82 is located immediately below the floor 78 of the food storage compartment 22. The portion bin 82 is loaded with food via an opening 84 in the floor of the food storage compartment 22 by rotation of the portion dispenser for a suitable number of revolutions. In the preferred embodiment, it has been found that by locating dispensing arm 70 with barrier 80 just past the opening 84 and rotating the center post 76 in a counterclockwise direction until it again sweeps past the opening 84, enough food is swept through the opening 84 into the portion bin 82 for subsequent release for cooking. In one embodiment, the controller includes an adjustable, predefined "portion remaining counter" which is decremented as each portion is dispatched for cooking. When the amount of food is above a predefined threshold, the control arms sweep through a 360° arc to direct a full portion of food into the food compartment, leaving them in the orientation shown in FIG. 11. When the counter is reduced to a predefined value, the arms 70–74 are swept through a multiple number of complete revolutions (preferably three revolutions), to ensure that the appropriate volume of food is oriented and swept into the portion bin 82 from the now-reduced volume of food contained in the food storage compartment 22. When the portion remaining counter is decremented to an adjustable, predefined count, the control may transmit a signal to, for example, power a light or buzzer indicating to the operator that the food storage compartment 22 needs to be refilled.

In an alternative embodiment, weight sensing means may be located in the food storage compartment 22 to sense the weight of, and thereby determine the amount of, food in the compartment.

In another alternative embodiment, additional weight sensing means may be located in the portion bin 82 and coupled to the control in order to portion the food by weight rather than volume. In this alternative embodiment, the control would transmit a signal to the drive motor of the portion dispensing arms to stop rotation of the arms once the weight sensor in the portion bin registered the predetermined portion weight.

In another alternative embodiment which is particularly suitable for automatically dispensing frozen food by count, rather than by weight or volume, a conventional electric eye may be positioned in the path of the opening 84 to sense when food has fallen through the opening into the portion bin 82 and maintain a count thereof. In this embodiment, the opening would be configured in a size suitable to allow one piece of food (e.g., one chicken nugget) through the opening at a time. If the preselected portion count for the food items is, for example, six, the system control could stop movement of the control arms when the count sensed by the electric eye reaches six. This embodiment may also include a movable barrier which may be actuated to cover the opening 84 once the number of food items equal to the portion count has passed through the opening.

Figure 12:
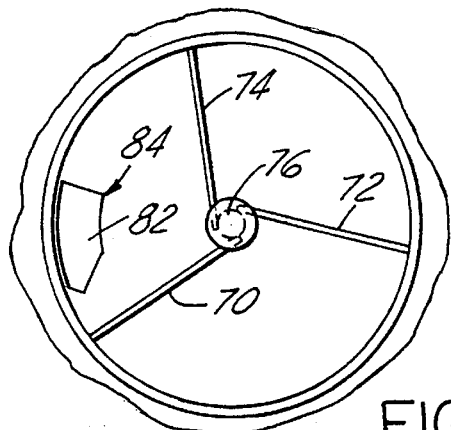
FIG. 12 is a top view of the food storage compartment.
Figure 11:
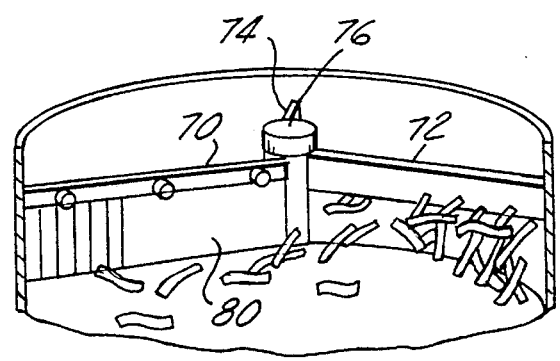
FIG. 11 is a partial perspective view of the arms of the portion controller.

As shown in FIG. 12, the control arms 70–74 are preferably mounted upon the center post 76 such that the arms extend on a tangent from the outer surface of the center post outward to the wall of the storage compartment 22. When mounted in this manner, the food is urged, upon rotation of the arms 70–74, from the center of the food compartment towards the outer wall of the compartment where the opening 84 for the portion bin 82 is located.

Figure 13:
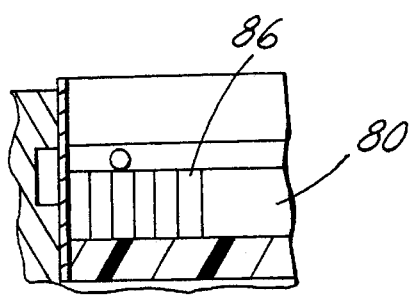
FIG. 13 is cutaway view of the dispenser arm blade.

Referring to FIG. 13, the end of the barrier 80 preferably comprises a plurality of plastic strips 86 which, in contrast to the solid plastic portion of the barrier 80 are more forgiving as they brush the food pieces up to and over the opening 84 into the food bin. This structure reduces the likelihood of breakage of the frozen food pieces as they are dispensed into the portion bin.

Figure 23:
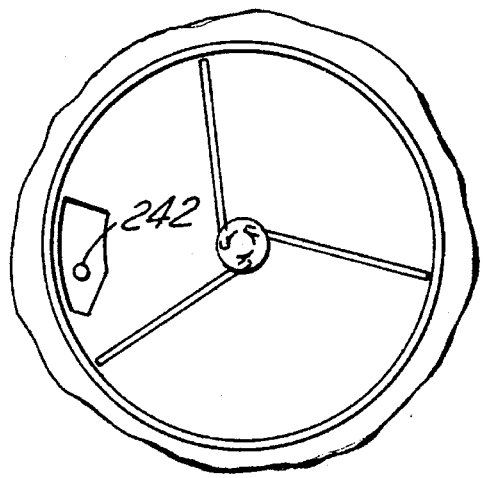
FIG. 23 is a top view of the open food storage compartment showing the food portion bin and agitator.

Referring again to FIGS. 22 and 23, an agitator 242 may be provided on the inside of the access door 60 of the food storage compartment to interfere with the food collected in the portion bin when the access door 60 is open to deliver the food portion to the food basket 38. The agitator 242 may be an elongate post mounted in the generally vertical orientation on the inside of the access door 60, such that as the access door drops open, the post moves through the portion bin, thereby jostling the food therein to ensure that it has not frozen in place within the portion bin. It should also be noted that the access door 60 may be spring loaded so that the spring force assists the opening of the door when desired. It will be appreciated that the agitator 242, as well as a spring mount on the access door 60, serve to prevent the food and the door, respectively, from freezing in place in the event there is a long duration of time between orders.

Figure 16:
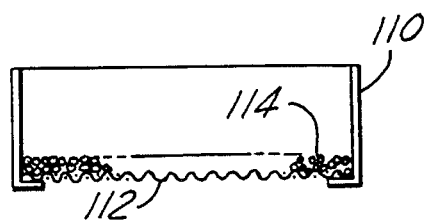
FIG. 16 is a partial cross-sectional view of the filter in the air purifier.
Figure 14:
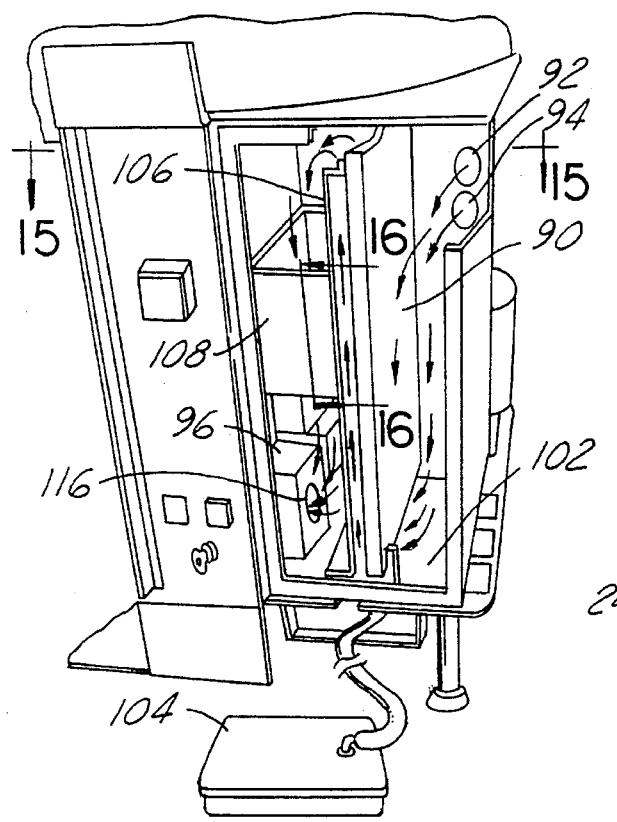
FIG. 14 is a perspective view of the lower front right section of the fryer showing the air purifier.
Figure 15:
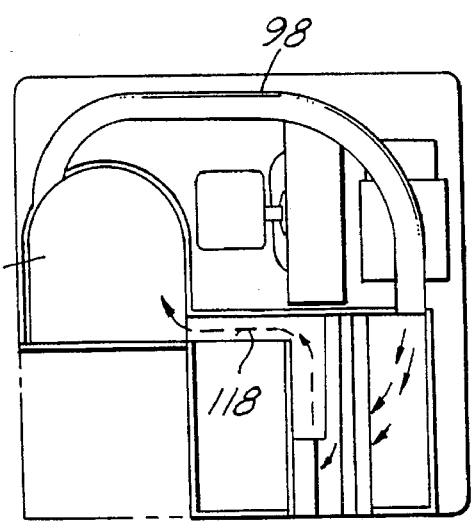
FIG. 15 is a top view in cross-section.

Referring now to FIGS. 14 and 15, the air purifier 26 includes a condenser in the form of a generally smooth planar cold plate 90 interposed in the purifier chamber between air inlets 92–94 and fan 96. Fumes from the cooking chamber 24 are drawn through suitable conduits 98–100, through inlets 92–94. The fumes are entrained along the major surfaces of the cold plate 90 where much of the water and volatile organic compounds are condensed out of the atmosphere where they trickle down the plate to a drain (not shown) in the floor 102 of the purifier chamber. The drain opening in the floor 102 can be connected directly to a permanent drain, or can be fitted to a temporary removable holding tank 104 such as that shown in FIG. 14. The entrained fumes flow up the opposite major surface of the cold plate and around barrier 106 where they are drawn through an additional filter 108. Filter 108 can be a conventional charcoal filter, or it can be a filter box 110 (shown in FIG. 16) including a screen 112 upon which charcoal granules 114 are placed and through which the entrained fumes travel as they are drawn by the fan 96 through the outlet 116, through a second conduit 118, and back into the cooking chamber 24. Thus, the cold plate condenses out bitter smelling organic compounds and the filtered fumes are returned to the remote cooking chamber 24, thereby keeping the atmosphere of the cooking chamber smelling fresh.

In an alternative embodiment, the entrained fumes may be vented out of the fryer, and preferably out of the building in which the fryer is installed, rather than recycled through the second conduit 118 back into the cooking chamber 24.

It will be appreciated by those skilled in the art that the simple design of the air purifier allows for easy cleaning by wiping off the smooth-surfaced, solid cold plate and replacing the charcoal filter. This easy-to-clean and maintain purifier is a stark contrast to previous conventional filtering systems with more complex conventional filters which are harder to maintain and must be frequently replaced. Also, use of a cold plate containing suitable liquid, such as water, increases the energy efficiency of the purification system, since, once the cold plate contents are chilled, or at least partially frozen, minimal refrigeration is required to maintain the cold plate in its optimal operating condition.

As further described hereinafter, the location of the conduits 98, 100 from the outlet of the cooking chamber 24 to the inlet of the air purification chamber 26 efficiently utilizes the heat exchange of the cooling air drawn through the back of the unit and over the surface of the conduits, thereby aiding in the cooling of the fumes for later condensation of unwanted volatiles in the purifier, and further increasing the energy efficiency of the unit.

Figure 17:
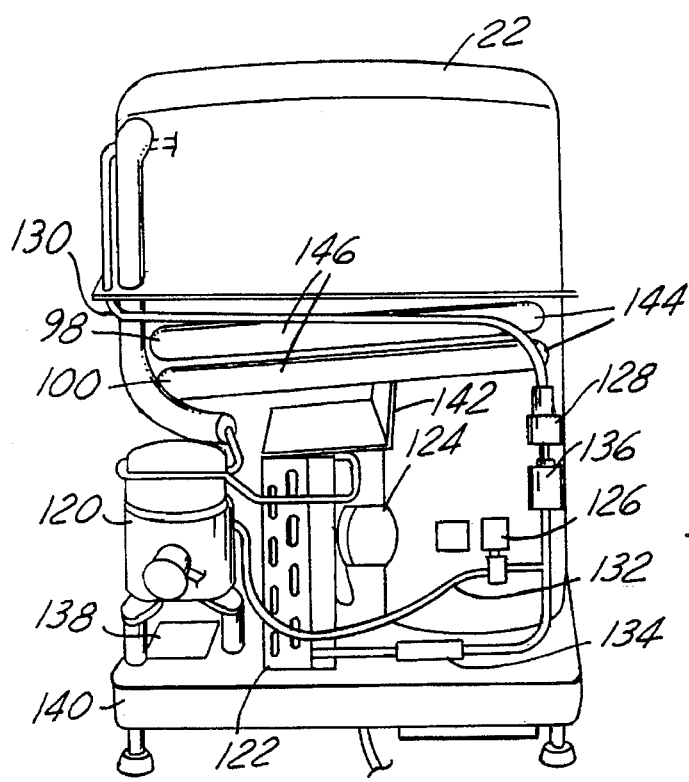
FIG. 17 is a rear view of the fryer.

Referring now to FIG. 17, the fryer 20 of the present invention preferably utilizes a single compressor 120, condenser 122, and fan 124 to refrigerate both the food storage compartment 22 and the cold plate 90. The control 28 is operably connected to valves 126 and 128 to route liquid refrigerant either to the food storage compartment 22 through conduit 130, or to the cold plate via conduits 132, as required. A conventional filter 134 is utilized in the preferred embodiment to remove excess water from the refrigerant as it is cycled from the refrigeration condensing unit 122 back through the cooling system. Since the amount of refrigerant required to effectively cool the food storage compartment 22 is less than that required to maintain the cold plate 90, a reservoir 136 is utilized to collect refrigerant upstream from the valve 126 and to dispense that refrigerant when the valve 126 is opened to circulate the refrigerant through conduits 132 to the cooling plate, In this manner, adequate refrigerant is quickly routed to the cooling plate when the central control 28 terminates the food storage compartment 22 cooling cycle and initiates the cooling plate cooling cycle. The refrigeration condensing unit may comprise any condenser and compressor combination adequate to cool the refrigerant. A Blissfield #60033 condenser is preferably utilized as the condenser, and a Tecumseh AE3425Y compressor is preferably utilized as the compressor for the fryer 20 of the present invention. While these components are adequate to service both the food storage compartment 22 in the cold plate 90, other known cooling systems may be employed to separately maintain the food storage compartment 22 and the cooling plate 90 at operational temperatures. However, the use of the single refrigeration system coupled with the central control 28 to cool both the food storage compartment 22 and the cold plate 90 results in a less complex, lower cost system with reduced peak power demand.

While the fryer 20 is normally covered with a stainless steel shell 30, the system is more than adequately ventilated by the fan 24 which draws ambient air through a screened opening 138 in the base 140. It should be noted that this air flow through the back of the fryer 20 is engineered to maximize the energy efficiency of the system. Referring to FIG. 18, as the relatively cool ambient air is drawn in through the screened vent 138, it travels past the compressor 120 by the conduits 98, 100, and the condenser 122, and is drawn by the fan 124 past the other end of the conduits 98, 100 and out the top. One or more baffles, such as the baffle 142, may be employed to confine the relatively cooler air on one side of the unit where it absorbs the heat of the compressor and the conduits 98, 100 containing the hot vapor being routed from the cooking chamber 24 to the purifier 26. As the ambient air travels past the condenser and through the fan 124, it has picked up heat through the previously described heat exchange. However, it is still capable of absorbing some heat from the other side of the conduits 98, 100, since the fumes traveling through the conduits (at 144) are relatively hotter at the exit point of the cooking chamber 24 than at the points (at 146) where the fumes are about to enter the purifier 26 for further cooling and condensation. Thus, the ambient air intake and flow is directed to achieve maximum heat exchange, thereby further increasing the energy efficiency of the system.

Referring now to FIGS. 1 and 19, the fryer 20 preferably utilizes a programmable control 28 which operates the aforementioned refrigeration system to maintain the appropriate temperatures in the food storage compartment 22 and the cold plate 90, operates the heating coil when required to maintain the appropriate cooking temperature in the fry vessel 36, and powers the appropriate drive motors to generate the food portioning, dispensing, cooking, draining, and delivery cycles in response to an operator input.

In the preferred embodiment, the control includes a conventional microprocessor with a multi-task operating system, such as the Motorola M6802, with the suitable system maintenance and operation cycles programmed and permanently encoded in a read-only memory (ROM) chip, such as Intel #2764. The microprocessor includes a suitable number of inputs to allow for connection to various system condition sensors, including temperature and/or weight sensors for providing temperature and/or weight data from the food storage compartment 22, cooking chamber 24 and cold plate 90, as well as other inputs which are connected to manual operator switches 62, 148 and/or control panel lights (not shown).

Referring to FIG. 19, the basic tasks performed by the controller include the clock task, the basket cycle control task, the oil temperature control task, and the refrigeration control task. The clock task, indicated at 202, includes periodically (preferably every second) monitoring system inputs, including any operator switches and/or push-buttons to determine whether any switches and/or push-buttons have been activated. Upon determining that a switch or push-button, or any other monitored input, has been activated, the clock task then signals the controller to perform whatever other appropriate tasks are required in response to the activated input. The clock task may also output signals, as appropriate, necessary to activate any status indicator lamps or horns.

When, for example, the clock task determines that the operator has activated the appropriate switch to begin a cooking cycle, the controller, at 204, transmits the output signals necessary to complete a cooking cycle. For example, in one embodiment, a signal activating the motor to drive the access door and food basket to its loading position, as previously described, is transmitted by the control task logic along with the necessary signal to release the food storage compartment door latch, thereby releasing the food from the portion bin into the waiting food basket. The access door motor is then powered to close the door, and immerse the basket in the frying vessel. At a predetermined time thereafter (preferably within a few seconds after the food storage compartment door is closed), the drive motor for the portion controller is activated as previously described to deposit another portion of food in the portion bin for the next cooking cycle.

After a predetermined time and/or oil temperature conditions (about 30–150 seconds and preferably about 40 seconds), the basket cycle control then activates the access door drive motor as required to position the access door and food basket to the drain position. Upon lapse of the pre-set draining time (about 4–30 seconds and preferably 14 seconds), the control 28 again activates the drive motor for the access door 54 to position the door in the discharge position (shown in FIG. 9), thereby delivering the ready-to-eat food to a suitable container 62. After another predetermined time period, the control signals the access door motor as appropriate to drive the motor to position the access door and the now empty food basket in the closed position, completing the cooking cycle and placing the system in the ready position for the next cooking cycle. The time periods for each of the sections of the cycle may, of course, be varied, depending upon the size of the fryer 20, the type of food, the size of the portion, etc.

It will be appreciated that, as described above, many of the steps of the cycle initiated on a timed basis, these steps could alternatively be invoked as a result of other inputs (e.g., position sensors, weight sensors, etc.) without departing from the spirit of the invention.

Referring still to FIG. 19, the controller also simultaneously performs the oil temperature control tasks indicated at 206 necessary to power the heating coil to heat the oil at start-up, during a cooking cycle, and when the system is ready but idle. The oil temperature control task monitors inputs such as an oil temperature thermistor (which is preferably mounted in the oil reservoir below the immersed food basket. Again, however, one or more suitable time-based temperature maintenance cycles, based upon pre-set time periods, may be employed in place of or to augment the temperature-responsive control described herein.

At start-up, the oil temperature control task drives the heating coil at full power (about 1300 watts) to provide a rapid ramp-up of the oil temperature in preparation for operation of the system.

During idle times, the control powers the heating coil at a reduced power (about 400 watts) to save energy, and to reduce burning of the cooking oil during idle periods. The control can continuously monitor the input of the oil temperature thermistor to determine whether the oil temperature has fallen below a predetermined lower threshold of the cooking temperature range. In one embodiment, the control automatically signals the heating coil to operate at full power at the onset of a cooking cycle in anticipation of the temperature drop resulting from the immersion of the frozen food in the oil during cooking. However, the oil temperature control task could alternatively power the heating coil to control the temperature of the oil solely as a function of the input from the oil temperature thermistor.

The control may also include logic to power the heating coil on a duty cycle whenever the system is ready but idle. For example, in one embodiment, the control generates signals to power the heating coil at full power for a period of 200 milliseconds, followed by power off for 300 milliseconds, full power for 200 milliseconds, and so on. This duty cycle operation of the heating element lowers the heating element's skin temperature by about 50 degrees, which reduces the rate of degradation of the oil, as well as reducing the power consumption of the heater coil.

The control may also be provided with logic for determining cooking oil age so that the system is automatically disabled from use whenever the cooking oil has been at an operating temperature for a period of time in excess of a predetermined value. If the oil has been "hot," i.e., above the predetermined value, for a period greater than the selected time, the control transmits a signal to disable the power to the heating coil and/or inhibits the operation of the basket cycle control task, to thereby prevent operation of the deep fryer until the oil has been replaced with new oil. The control may also signal a warning light or buzzer (not shown) to indicate to the operator that the system is locked out due to the age of the oil. In one embodiment, a cumulated operating time of 120 hours is the threshold beyond which the control disables operation of the heater coil and/or food basket and indicates an "old oil" condition. It will be appreciated that the control may signal a warning light or buzzer indicating oil age at the same time as it disables the heater coil or food basket or, alternatively, at a preselected earlier time to give the operator advance warning of the need to change the oil prior to shut down.

In the refrigeration cycle, the control, at 208, alternates circulation of refrigerant between the freezer in the food storage compartment 22 and cold plate 90 in the air purifier 26. The flowchart for the run mode sequence employed by the refrigeration control task 208 is illustrated in FIG. 20. When the controller begins performance of the refrigeration control task at 212 during the normal operating mode of the fryer, the control transmits the appropriate signals, at 214, to activate the valves necessary to route the refrigerant to the cold plate 90 until either the cold plate thermistor indicates that the cold plate temperature has dropped below a predefined set point, or until some predefined maximum cycle time has elapsed. The system next checks the food storage compartment temperature at 216. If the food Storage compartment temperature is above the predefined set point, the system activates the appropriate valves to circulate the refrigerant to the food storage compartment for a predefined period, again, preferably five minutes. If the food storage compartment is below the predefined set point, the system, at 218, stops the compressor for a predetermined period, opens the valve to the plate coil and after delaying (about 3 minutes) for pressure equalizations, restarts the compressor, as indicated at 220. It should be noted that the control preferably automatically suppresses any signals by the oil temperature control task to power the heater coil during compressor start-up to minimize the peak power load of the system. Thus, by limiting the refrigeration cycle for either the freezer or the cold plate to a maximum time, preferably about five minutes, (or less, if the food storage compartment freezer or cold plate has reached a suitable temperature), the refrigeration control effectively maintains both the cooling plate 90 and the food storage compartment 22 at their operating temperatures, both at run time and while the fryer is idle, without the need of redundant space-consuming and energy-consuming refrigeration systems.

Figure 21:
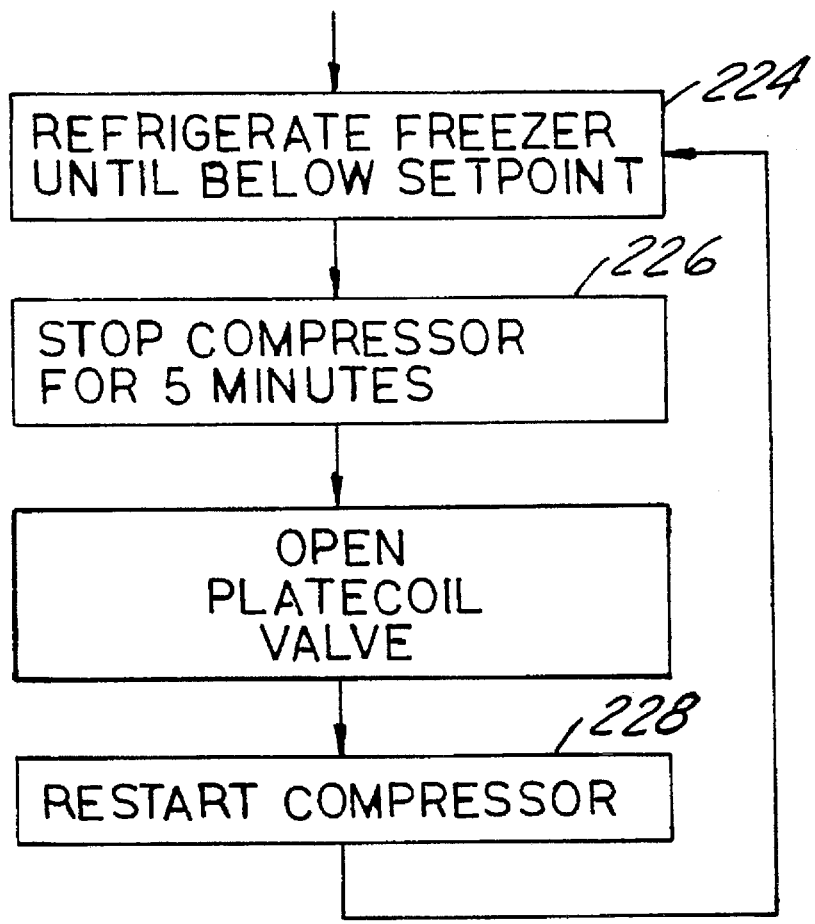
FIG. 21 is a flowchart of the idle mode sequence of the refrigeration task.

FIG. 21 illustrates the idle mode sequence utilized by the refrigeration control task 208. When the fryer is in idle mode, such as when it is turned off after food service hours or otherwise for prolonged periods, a simpler sequence is invoked by the refrigeration control task which devotes compressor time and the energy related thereto solely to maintaining the appropriate temperature in the food storage compartment. During idle mode, the refrigeration control task operates the appropriate valves to route refrigerant to the food storage compartment and, as required, operates the compressor to refrigerate the food storage compartment until it falls below a predetermined set point. The refrigeration control task next shuts down the compressor for a predetermined rest period, preferably ten minutes, as indicated at 226, and equalizes the differential pressure through the cold plate coil. Following the lapse of the predetermined rest period, the compressor is restarted, at 228, completing the idle mode refrigeration cycle.

The control 28 is preferably programmed to detect multiple inputs (e.g. an operator pressing the push-button 62 three times), storing the number of inputs, and repeating the cooking cycle accordingly for preparation of multiple portions.

While the best mode for carrying out the invention has been described in detail, those familiar with the art to which this invention relates will recognize various alternative designs and embodiments for practicing the invention as disclosed by the following claims.

What is claimed is:

1. An automated deep fryer comprising:

a refrigerated food storage compartment connected with a portion controller and food dispenser;

a cooking chamber isolated from the storage compartment, the cooking chamber including a food basket mounted for movement to a variety of preselected positions;

a control for programmed dispensing, preparation and serving of a preselected portion of food in response to an operator's input; and an air purifier connected with the cooking chamber, said air purifier including a fan for extracting gases from the cooking chamber, and a cold plate having a generally smooth surface over which the fumes from the cooking chamber travel, the cold plate being interposed between the fan and the cooking chamber.

2. The deep fryer of claim 1 further including means for recirculating the purified air into the cooking chamber.

3. The deep fryer of claim 1 wherein the air purifier further includes a filter positioned between the cold plate and the fan.

4. The deep fryer of claim 1 further including a vent connected to the air purifier and through which gases are removed from the deep fryer.

5. An automated deep fryer comprising:

a cooking chamber including a frying vessel having an oil reservoir, an access door, and a food basket mounted for controlled movement to a variety of preselected positions including a closed position with the food basket at least partially immersed in the frying vessel;

a refrigerated food storage compartment including a portion controller and food dispenser, and a second access door mounted on the storage compartment for controlled movement from a closed position to an open position through which food may be dispensed into the food basket; and a control for the dispensing, preparation and serving of a preselected portion of food in response to an operator's input.

6. The deep fryer of claim 5 further including an air purifier connected with the cooking chamber, said air purifier including a fan for extracting the gases from the cooking chamber, and a condenser for removing water and other by-products from the gases.

7. The deep fryer of claim 6 including means for recirculating the purified air into the cooking chamber.

8. An automated deep fryer comprising:

a cooking chamber including a frying vessel having an oil reservoir, and a food basket mounted for controlled movement to a variety of preselected positions;

a refrigerated food storage compartment including a portion controller and food dispenser;

an air purifier connected with the cooking chamber, said air purifier including a fan for extracting gases from the cooking chamber and a condenser for removing water and other by-products from the gases; and a control including a processor having a plurality of inputs connected to sensors in the cooking chamber and food storage compartment, a plurality of outputs connected to the cooking chamber and food storage compartment, and associated logic for automatically controlling the operation of the fryer to maintain the appropriate temperatures in the food storage compartment, the purifier condenser, and the cooking vessel, as well as dispense, prepare and serve a preselected portion of food in response to an operator's input.

9. The deep fryer of claims 1 or 8 wherein the cooking chamber further includes an access door mounted for controlled movement to a variety of preselected positions, and wherein the food storage compartment includes a second access door mounted for controlled movement from a closed position to an open position through which food may be dispensed into the food basket.

10. The deep fryer of claim 9 wherein the food basket is mounted on the access door.

11. The deep fryer of claims 6 or 8 wherein the condenser comprises a cold plate interposed between the fan and the cooking chamber, the cold plate having a generally smooth surface over which the fumes from the cooking chamber travel.

12. The deep fryer of claim 11 wherein the cold plate is filled with a liquid which is suitably chilled to maintain the surface of the cold plate at the desired operating temperature.

13. The deep fryer of claim 12 wherein the liquid is at least partially frozen to maintain the surface of the cold plate at the desired operating temperature.

14. The deep fryer of claims 5 or 8 further including a vent through which gases are removed from the deep fryer.

15. The deep fryer of claim 9 wherein the food storage compartment is located generally above the cooking chamber and the second access door is mounted on the bottom wall of the storage compartment for dispensing food with the aid of gravity.

16. The deep fryer of claim 9 wherein the second access door is located outside the cooking chamber whereby the cooking chamber is isolated from the storage compartment when the access door on the cooking chamber is closed.

17. The deep fryer of claim 16 wherein the cooking chamber access door is mounted on a generally vertical side wall of the cooking chamber, and wherein the second access door is mounted in a spaced relationship to the cooking chamber access door such that when the access door and the second access door are each moved to the load position the food is released from the storage compartment directly into the food basket.

18. The deep fryer of claim 17 wherein the cooking chamber access door is positioned on the side wall of the cooking chamber such that, as the cooking chamber access door is moved to a closed position, the top surface of the cooking chamber access door contacts the second access door and urges the second access door into a closed position, and wherein when the cooking chamber access door reaches the closed position, the top surface of the cooking chamber access door contacts the second access door and maintains the second access door in the closed position.

19. The deep fryer of claims 1, 5 or 8 wherein the storage compartment is generally circular in cross section, and wherein the portion controller and dispenser comprises a plurality of radially extending arms each of which is mounted on a rotating center post powered by a drive motor, and wherein at least one arm is provided with a barrier which, upon rotation of the portion controller, aggregates and sweeps the food ahead of it as the arm is rotating, and a portion bin located immediately below the floor of the storage compartment.

20. The deep fryer of claim 19 wherein the control includes logic for transmitting a signal to activate the drive motor in the portion controller and dispenser to rotate the center post by an amount suitable to load the portion bin with a preselected portion for subsequent release into the food basket.

21. The deep fryer of claim 20 wherein the portion controller and dispenser further includes an adjustable, predefined portion remaining counter which is decremented as each portion is dispatched, and wherein the signal transmitted by the control to the portion controller and dispenser drive motor varies the extent of rotation of the center post as a function of the then current value of the portion remaining counter.

22. The deep fryer of claim 19 wherein the portion controller and dispenser further includes an adjustable, predefined portion remaining counter which is decremented as each portion is dispatched, and the control further includes logic for transmitting a signal to power an indicator to the operator that the food storage compartment needs to be refilled whenever the portion remaining counter is decremented to a predefined value.

23. The deep fryer of claim 19 wherein the portion bin further includes a weight sensor for sensing the weight of the food in the portion bin, and wherein the control is connected to the weight sensor and includes logic to vary the signal transmitted to the portion controller and dispenser drive motor as a function of the output of the weight sensor to thereby direct the appropriate weighted portion into the portion bin.

24. The deep fryer of claim 19 wherein the food storage compartment includes a weight sensor, and wherein the control is connected to the weight sensor for periodic receipt of signals therefrom to thereby determine the amount of food remaining in the storage compartment.

25. The deep fryer of claim 19 wherein the control arms are mounted upon the center post such that the arms extend generally tangentially from the outer surface of the center post outward to the wall of the storage compartment.

26. The deep fryer of claim 19 wherein the barrier comprises a plurality of plastic strips.

27. The deep fryer of claims 5 or 8 wherein the oil reservoir has a generally tapered cross section, thereby reducing the volume of the oil in the reservoir beneath the food basket.

28. The deep fryer of claims 5 or 8 wherein the oil reservoir is generally frustoconically shaped.

29. The deep fryer of claims 5 or 8 wherein the outer side walls of the frying vessel are generally cylindrical in shape.

30. The deep fryer of claims 5 or 8 further including a heating coil having a generally helical configuration with the coils having a varying diameter to conform generally with the shape of the oil reservoir, the heating coil being removably mounted within the frying vessel such that the coil extends into the oil reservoir in the space immediately below the space occupied by the fully immersed food basket.

31. The deep fryer of claim 30 wherein the frying vessel further includes a cold space below the space in the frying vessel occupied by the heating coil.

32. The deep fryer of claim 9 further including an agitator mounted on the inside surface of the second access door, which agitator contacts the food in the portion bin as the second access door moves from the closed to the load position, thereby jostling the frozen food portion to ensure that it falls from the portion bin into the food basket.

33. The deep fryer of claim 32 wherein the agitator is an elongate post mounted on the inside surface of the second access door to extend generally vertically within the portion bin when the second access door is in the closed position and sweep through the area of the portion bin containing the food as the second access door moves from the closed position to an open position for unloading the food into the food basket.

34. The deep fryer of claims 5 or 8 wherein the control further includes logic for monitoring the cumulative operating time that the oil in the oil reservoir has been maintained at a preselected operating temperature, comparing the cumulative operating time to a preselected oil age threshold time, and, when the cumulative operating time exceeds the oil age threshold time, generating signals which inhibit the deep fryer from heating the oil.

35. The deep fryer of claims 5 or 8 wherein the control further includes logic for monitoring the cumulative operating time that the oil in the oil reservoir has been maintained at a preselected operating temperature, comparing the cumulative operating time to a preselected oil age threshold time, and, when the cumulative operating time exceeds the oil age threshold time, generating signals which disable the deep fryer from any food dispensing or preparation operations.

36. The deep fryer of claim 8 wherein the logic for maintaining the appropriate temperatures in the food storage compartment and the purifier condenser performs a refrigeration control task which generates control signals to alternate the circulation of refrigerant between the freezer in the food storage compartment and the purifier condenser to simultaneously and efficiently maintain both the food storage compartment and the purifier condenser at operating temperatures.

37. The deep fryer of claim 34 further including a heating element removably mounted within the frying vessel such that the element extends into the oil reservoir in the space below the space occupied by the fully immersed food basket, wherein the logic for maintaining the appropriate temperature in the cooking vessel performs an oil temperature control task which generates control signals to power the heating element at system start-up, during a cooking cycle, and when the system is ready but idle.

38. The deep fryer of claim 37 further including a refrigeration condensing unit for cooling the refrigerant circulated to the freezer in the food storage compartment and the cold plate in the air purifier and wherein the logic for automatically controlling the operation of the fryer to maintain the appropriate temperatures in the food storage compartment, the purifier condenser, and the cooking vessel includes logic for suppressing any signals otherwise generated by the oil temperature control task logic to power the heater coil whenever the refrigeration control task logic has generated signals to start the compressor, thereby minimizing the peak power load of the system.

39. The deep fryer of claim 37 wherein the oil temperature control task logic includes logic for generating control signals to power the heating element on a time-based duty cycle when the system is ready but idle.

40. The deep fryer of claim 39 wherein the time-based duty cycle consists of alternating between maintaining the heating element on for about 200 milliseconds and off for about 300 milliseconds during the period when the system is ready but idle, thereby reducing the skin temperature of the element and reducing degradation of the cooking oil.

41. The deep fryer of claims 5 or 8 further including an oil replenishment reservoir;
  an oil conduit connected at one end to the oil replenishment reservoir and having the opposite end discharging into the frying vessel reservoir;
  a pump connected to a conduit for controlled discharge of the oil from the oil replenishment vessel into the frying vessel; and
  wherein the control includes logic for periodically activating the pump to discharge oil into the frying vessel based upon the existence of preselected conditions.

42. The automated deep fryer of claim 41 wherein the logic includes an order counter for counting the number of food orders prepared by the deep fryer, logic for activating the pump to discharge a preselected amount of oil into the frying vessel after the order counter has reached a predetermined value, and setting the order counter to zero upon discharge of the preselected amount of oil.

43. The deep fryer of claim 41 further including:

first sensing means mounted within the frying vessel generally at a depth equal to the location of the bottom of the fully immersed food basket;

a second temperature sensing means located in the frying vessel at a depth just below the desired oil level; and wherein the control includes logic for periodically monitoring the signals received from the first and second temperature sensors, and generating a signal to activate the pump to discharge oil into the frying vessel whenever the signals from the first and second temperature sensors meet preselected criteria.

44. The deep fryer of claim 43 wherein the preselected oil replenishment criteria is that the first temperature sensor indicates a temperature greater than a first preselected value and the second temperature sensor indicates a temperature less than a second preselected value.

45. The deep fryer of claim 19 wherein the portion bin further includes a sensor for sensing the number of food items which have fallen into the portion bin, and logic for comparing the number sensed to a preselected portion count and, when the sensed number of items in the portion bin is equal to the preselected portion count, generating a signal to the portion controller and dispenser to stop dispensing items into the portion bin, thereby dispensing the food items by count.

46. The deep fryer of claim 1 wherein the cold plate is filled with a liquid which is suitably chilled to maintain the surface of the cold plate at the desired operating temperature.

47. The deep fryer of claim 46 wherein the liquid is at least partially frozen to maintain the surface of the cold plate at the desired operating temperature.

48. The deep fryer of claim 5 wherein the food storage compartment is located generally above the cooking chamber and the second access door is mounted on the bottom wall of the storage compartment for dispensing food with the aid of gravity.

49. The deep fryer of claim 5 wherein the second access door is located outside the cooking chamber whereby the cooking chamber is isolated from the storage compartment when the access door on the cooking chamber is closed.

50. The deep fryer of claim 49 wherein the cooking chamber access door is mounted on a generally vertical side wall of the cooking chamber, and wherein the second access door is mounted in a spaced relationship to the cooking chamber access door such that when the access door and the second access door are each moved to the load position the food is released from the storage compartment directly into the food basket.

51. The deep fryer of claim 50 wherein the cooking chamber access door is positioned on the side wall of the cooking chamber such that, as the cooking chamber access door is moved to a closed position, the top surface of the cooking chamber access door contacts the second access door and urges the second access door into a closed position, and wherein when the cooking chamber access door reaches the closed position, the top surface of the cooking chamber access door contacts the second access door and maintains the second access door in the closed position.

52. The deep fryer of claim 5 further including an agitator mounted on the inside surface of the second access door, which agitator contacts the food in the portion bin as the second access door moves from the closed to the load position, thereby jostling the frozen food portion to ensure that it falls from the portion bin into the food basket.

53. The deep fryer of claim 8 further including a heating element removably mounted within the frying vessel such that the element extends into the oil reservoir in the space below the space occupied by the fully immersed food basket, wherein the logic for maintaining the appropriate temperature in the cooking vessel performs an oil temperature control task which generates control signals to power the heating element at system start-up, during a cooking cycle, and when the system is ready but idle.

54. The deep fryer of claim 53 further including a refrigeration condensing unit for cooling the refrigerant circulated to the freezer in the food storage compartment and the cold plate in the air purifier and wherein the logic for automatically controlling the operation of the fryer to maintain the appropriate temperatures in the food storage compartment, the purifier condenser, and the cooking vessel includes logic for suppressing any signals otherwise generated by the oil temperature control task logic to power the heating element whenever the refrigeration control task logic has generated signals to start the compressor, thereby minimizing the peak power load of the system.

55. The deep fryer of claim 53 wherein the oil temperature control task logic includes logic for generating control signals to power the heating element on a time-based duty cycle when the system is ready but idle.

56. The deep fryer of claim 55 wherein the time-based duty cycle consists of alternating between maintaining the heating element on for about 200 milliseconds and off for about 300 milliseconds during the period when the system is ready but idle, thereby reducing the skin temperature of the element and reducing degradation of the cooking oil.

\* \* \* \* \*